United States Patent
Torii

(10) Patent No.: US 10,235,611 B2
(45) Date of Patent: Mar. 19, 2019

(54) IMAGE FORMING APPARATUS, IMAGE FORMING METHOD, AND NON-TRANSITORY COMPUTER READABLE MEDIUM

(71) Applicant: FUJI XEROX CO., LTD., Tokyo (JP)

(72) Inventor: Takeshi Torii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 336 days.

(21) Appl. No.: 15/018,087

(22) Filed: Feb. 8, 2016

(65) Prior Publication Data

US 2017/0052746 A1    Feb. 23, 2017

(30) Foreign Application Priority Data

Aug. 20, 2015 (JP) ................. 2015-162703

(51) Int. Cl.
*G06F 15/00* (2006.01)
*G06K 15/02* (2006.01)

(52) U.S. Cl.
CPC ............... *G06K 15/1836* (2013.01)

(58) Field of Classification Search
CPC ................................ G06K 15/1836
USPC .................................... 358/1.15
See application file for complete search history.

(56) References Cited

U.S. PATENT DOCUMENTS

| 8,154,766 B2 | 4/2012 | Torii |
| 8,456,685 B2 | 6/2013 | Ono |
| 2009/0161163 A1* | 6/2009 | Klassen ............ G06F 3/124 358/1.18 |
| 2009/0185214 A1* | 7/2009 | Bellert ............ G06K 15/1806 358/1.15 |
| 2011/0194142 A1* | 8/2011 | Wakana ............ G06K 15/1856 358/1.15 |
| 2011/0255120 A1* | 10/2011 | Hirahara ............ G06F 3/121 358/1.14 |
| 2013/0070292 A1* | 3/2013 | Ohkawa ............ G06K 15/1817 358/1.15 |
| 2013/0258389 A1* | 10/2013 | Omura ............ G06F 3/1297 358/1.14 |
| 2016/0321525 A1* | 11/2016 | Takenaka ............ G06K 15/1857 |

FOREIGN PATENT DOCUMENTS

| JP | 2009-146251 A | 7/2009 |
| JP | 2010-221442 A | 10/2010 |
| JP | 2011-051234 A | 3/2011 |
| JP | 2012-152941 A | 8/2012 |

* cited by examiner

*Primary Examiner* — Mark R Milia
(74) *Attorney, Agent, or Firm* — Oliff PLC

(57) ABSTRACT

An image forming apparatus includes a processing unit group forming section, a converting section, and plural raster image processors. The processing unit group forming section forms plural processing unit groups by grouping plural processing units included in a print job. The converting section converts, for each of the plural processing units, the print job into intermediate data so as to form plural intermediate data groups corresponding to the plural processing unit groups. The plural raster image processors correspond to the plural intermediate data groups, each of the plural raster image processors performing a conversion process of converting a corresponding one of the plural intermediate data groups into raster data.

7 Claims, 5 Drawing Sheets

FIG. 3

| PAGE NUMBER | RESOURCES |
|---|---|
| 1 | Font1, Form1, Image1 |
| 2 | Font1, Form2, Image1, Image2 |
| 3 | Font1, Form2, Image1 |
| 4 | Font1, Image1 |
| 5 | Font1, Form2, Image1 |
| 6 | Image1, Image2, Image3 |
| 7 | Font1, Image1 |
| 8 | Font1, Form2, Image2 |
| ⋮ | ⋮ |

FIG. 4A

| DESTINATION RIP ID | RESOURCE ID | RESOURCE TYPE | IDENTIFICATION CODE | DOCUMENT ID | RESOURCE DATA SIZE | NUMBER OF TIMES OF USE | USED PAGE |
|---|---|---|---|---|---|---|---|
| 1 | T102 | Font1 | 00000705624E | 096D4EFFE0 | 45,322 | 1 | 1 |

FIG. 4B

| | DESTINATION RIP ID | RESOURCE ID | RESOURCE TYPE | IDENTIFICATION CODE | DOCUMENT ID | RESOURCE DATA SIZE | NUMBER OF TIMES OF USE | USED PAGE |
|---|---|---|---|---|---|---|---|---|
| R1 | 1 | T102 | Font1 | 00000705624E | 096D4EFFE0 | 45,322 | 1 | 1 |
| R2 | 1 | F104 | Form1 | 000000457866D | 096D4EFFE0 | 398,612 | 1 | 1 |
| R3 | 1 | I101 | Image1 | 000000601879D | 096D4EFFE0 | 2,450,938 | 1 | 1 |
| | ⋮ | ⋮ | ⋮ | ⋮ | ⋮ | ⋮ | ⋮ | ⋮ |

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-162703 filed Aug. 20, 2015.

BACKGROUND (i) Technical Field

The present invention relates to an image forming apparatus, an image forming method, and a non-transitory computer readable medium.

(ii) Related Art

An image forming apparatus such as a printer or multifunction peripheral performs a printing process on the basis of a print job input thereto. The print job includes a target document of the printing process, which is described in a page description language (PDL) such as PostScript. The print job described in a PDL (in a PDL format) is converted by the image forming apparatus into raster data recognizable by an output section that performs an output process (printing process) for embodying characters or images included in print data on a printing medium such as a sheet. This process is referred to as a raster image processor (RIP) process.

SUMMARY

According to an aspect of the invention, there is provided an image forming apparatus including a processing unit group forming section, a converting section, and plural raster image processors. The processing unit group forming section forms plural processing unit groups by grouping plural processing units included in a print job. The converting section converts, for each of the plural processing units, the print job into intermediate data so as to form plural intermediate data groups corresponding to the plural processing unit groups. The plural raster image processors correspond to the plural intermediate data groups, each of the plural raster image processors performing a conversion process of converting a corresponding one of the plural intermediate data groups into raster data. In a case where a set of processing units included in the plural processing unit groups use a common resource, the converting section includes the resource in preceding intermediate data that is obtained by converting a processing unit that is processed first in the set of processing units, and includes, instead of the resource, a reference instruction to refer to the resource included in the preceding intermediate data in subsequent intermediate data that is obtained by converting a processing unit that is processed subsequently in the set of processing units.

BRIEF DESCRIPTION OF THE DRAWINGS

An exemplary embodiment of the present invention will be described in detail based on the following figures, wherein:

FIG. 3 is a diagram illustrating resources that are used for a document on which a printing process is performed in the exemplary embodiment;

FIGS. 4A and 4B are diagrams illustrating examples of a resource management table;

DETAILED DESCRIPTION

Hereinafter, an exemplary embodiment of the present invention will be described with reference to the attached drawings.

Basic Exemplary Embodiment

Figure 1:
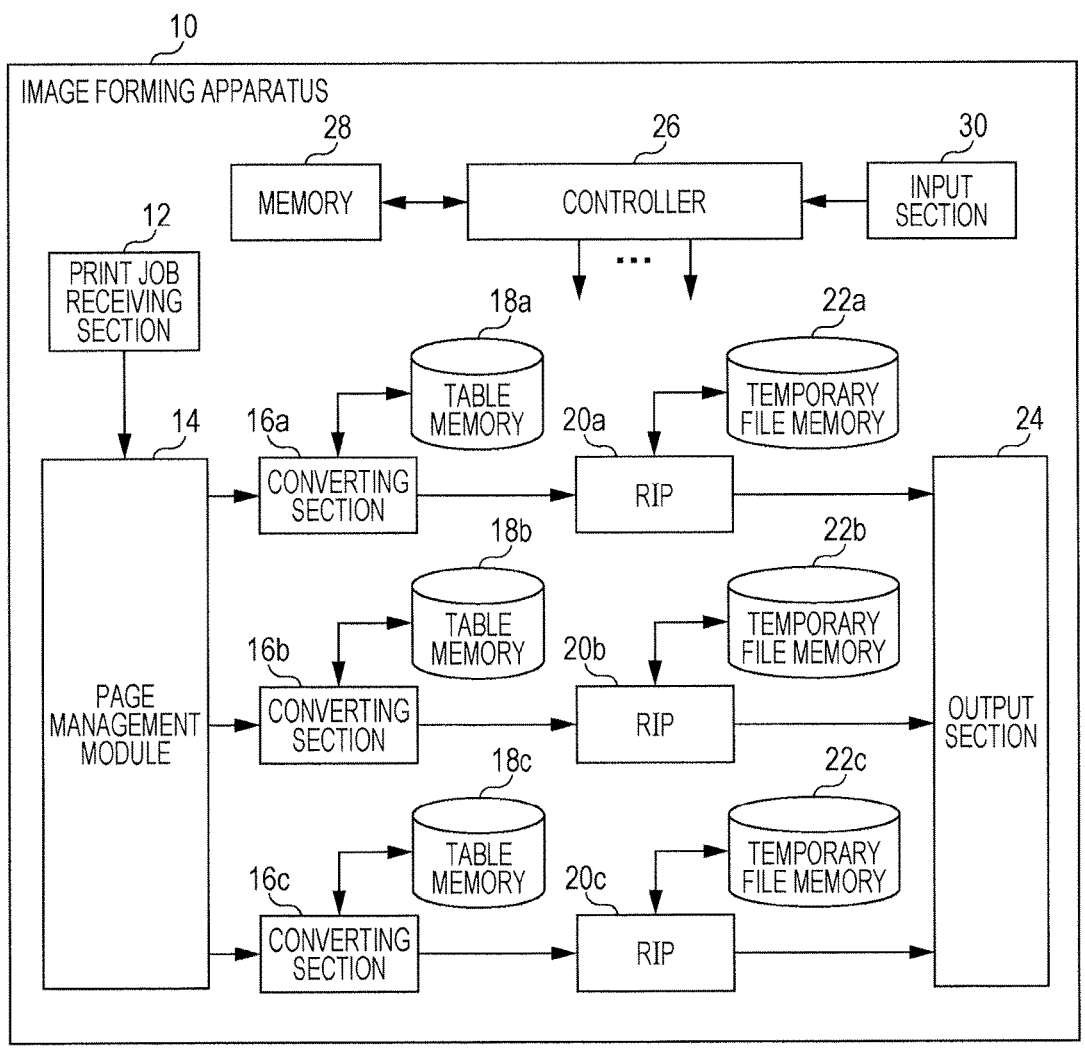
FIG. 1 is a schematic diagram illustrating the configuration of an image forming apparatus according to the exemplary embodiment.

FIG. 1 is a schematic diagram illustrating the configuration of an image forming apparatus 10 according to the exemplary embodiment.

A print job receiving section 12 receives a print job from a terminal or the like. The print job receiving section 12 includes a communication section, such as a local area network (LAN) card or an external connection interface, and receives a print job described in a PDL from the terminal via a network.

The print job is a print instruction to print a document including plural pages, and includes plural page data pieces (hereinafter also simply referred to as "pages"), which are regarded as processing units. The print job is described in a first PDL, in other words, is in a first PDL format. In a part of the print job in the first PDL format (for example, a header portion), resources are defined. The resources are pieces of data that are repeatedly used for individual pages and include font, form, image, and so forth. In the print job, a page that uses the resources includes information for referring to the defined resources (an instruction to use the resources).

In the exemplary embodiment, a print job in a PDF format, which is an example of the first PDL format, is input.

A page management module 14 performs a process of distributing, in units of pages, the print job received by the print job receiving section 12 to plural (three in the exemplary embodiment) processing paths. The processing paths are respectively provided for three raster image processors (RIPs) 20a to 20c, which will be described below. In each processing path, a conversion process of the PDL format is performed prior to a RIP process, and then a RIP process is performed by the RIP provided for the processing path.

Various methods are available as a method for distributing pages in the page management module 14. In the exemplary embodiment, each page is distributed in response to a request from a RIP. Specifically, the RIP transmits a signal for requesting a page to the page management module 14 after finishing a RIP process on the preceding page. In response to the signal, the page management module 14 distributes a page to be subsequently processed to the processing path corresponding to the RIP that has transmitted the request signal. Alternatively, the page management module 14 may request the RIP to perform a process. In this specification, a group of pages distributed to one processing path is defined as a "sub-job".

Converting sections 16a to 16c are provided on the respective processing paths and perform a process of converting individual pages in the first PDL format included in the print job into page data in a second PDL format, which is intermediate data. The converting sections 16a to 16c perform a conversion process in units of pages.

In a case where an instruction to use a resource is included in a page in the first PDL format, the converting sections 16a to 16c are able to include the resource (the definition of the resource) in the page converted to the second PDL format. In this specification, to include a resource in a page in the second PDL format is referred to as "to output a resource". Further, in a case where a resource included in a page subjected to a conversion process first among two pages in the same sub-job is also included in a subsequent page, the converting sections 16a to 16c are able to include, in the subsequent page converted into the second PDL format, a reference instruction to refer to the resource included in the preceding page. The conversion process will be described in detail below with reference to the flowchart illustrated in FIG. 2 and so forth.

In the exemplary embodiment, a process of converting a page in the PDF format as the first PDL format into a PostScript (PS) format as the second PDL format is performed. As described above, the image forming apparatus 10 includes three processing paths. In the exemplary embodiment, a converting section is provided for each processing path. Thus, the image forming apparatus 10 includes the three converting sections 16a to 16c.

In the exemplary embodiment, one converting section is provided for each of the three processing paths, but this is not always necessary. For example, all the conversion processes in the three processing paths may be performed by one converting section.

The image forming apparatus 10 stores information indicating, in a distinguishable manner for the individual processing paths, the resources output in the converting sections. In the exemplary embodiment, three table memories 18a to 18c are provided, which correspond to the three converting sections 16a to 16c (a table memory is provided for each processing path). Each of the table memories 18a to 18c stores a resource management table showing the resources that have been output in the corresponding processing path. The details of the resource management table will be described below.

The image forming apparatus 10 includes the three RIPs 20a to 20c provided for the individual processing paths. The RIPs 20a to 20c perform a process of converting each page that has been converted to the second PDL format to raster data recognizable by an output section 24, which will be described below (RIP process). In the exemplary embodiment, a converting section is provided for each RIP. Thus, a page in the second PDL format output from the converting section 16a undergoes a RIP process in the RIP 20a, a page in the second PDL format output from the converting section 16b undergoes a RIP process in the RIP 20b, and a page in the second PDL format output from the converting section 16c undergoes a RIP process in the RIP 20c.

Three temporary file memories 22a to 22c are provided, which respectively correspond to the three RIPs 20a to 20c. Each of the temporary file memories 22a to 22c stores a temporary file including resource data and raster data obtained through a RIP process performed by the corresponding RIP.

The output section 24 performs an output process (printing process) for reproducing raster data generated by the RIPs 20a to 20c on a printing medium. The output section 24 includes members held by a typical printer, for example, a toner, a photoconductor drum, a sheet feeder, and so forth.

A controller 26 is formed of, for example, a central processing unit (CPU) or a microprocessor, and performs control to operate individual sections of the image forming apparatus 10 in accordance with a program stored in a memory 28 that is formed of a hard disk, a read only memory (ROM), a random access memory (RAM), or the like.

An input section 30 is formed of a touch panel, a button, or the like, and is used to input a user instruction to the image forming apparatus 10. The image forming apparatus 10 is able to operate in two operation modes: a single job mode and a resource sharing mode. An instruction to select an operation mode is input from the input section 30. The details of the operation modes will be described below.

The schematic configuration of the image forming apparatus 10 has been described above.

Hereinafter, a description will be given of a flow of a printing process performed by the image forming apparatus 10 with reference to FIGS. 1 and 2. In this specification, a "printing process" conceptually includes conversion processes performed by the converting sections 16a to 16c, RIP processes performed by the RIPs 20a to 20c, and an output process performed by the output section 24.

Figure 2:
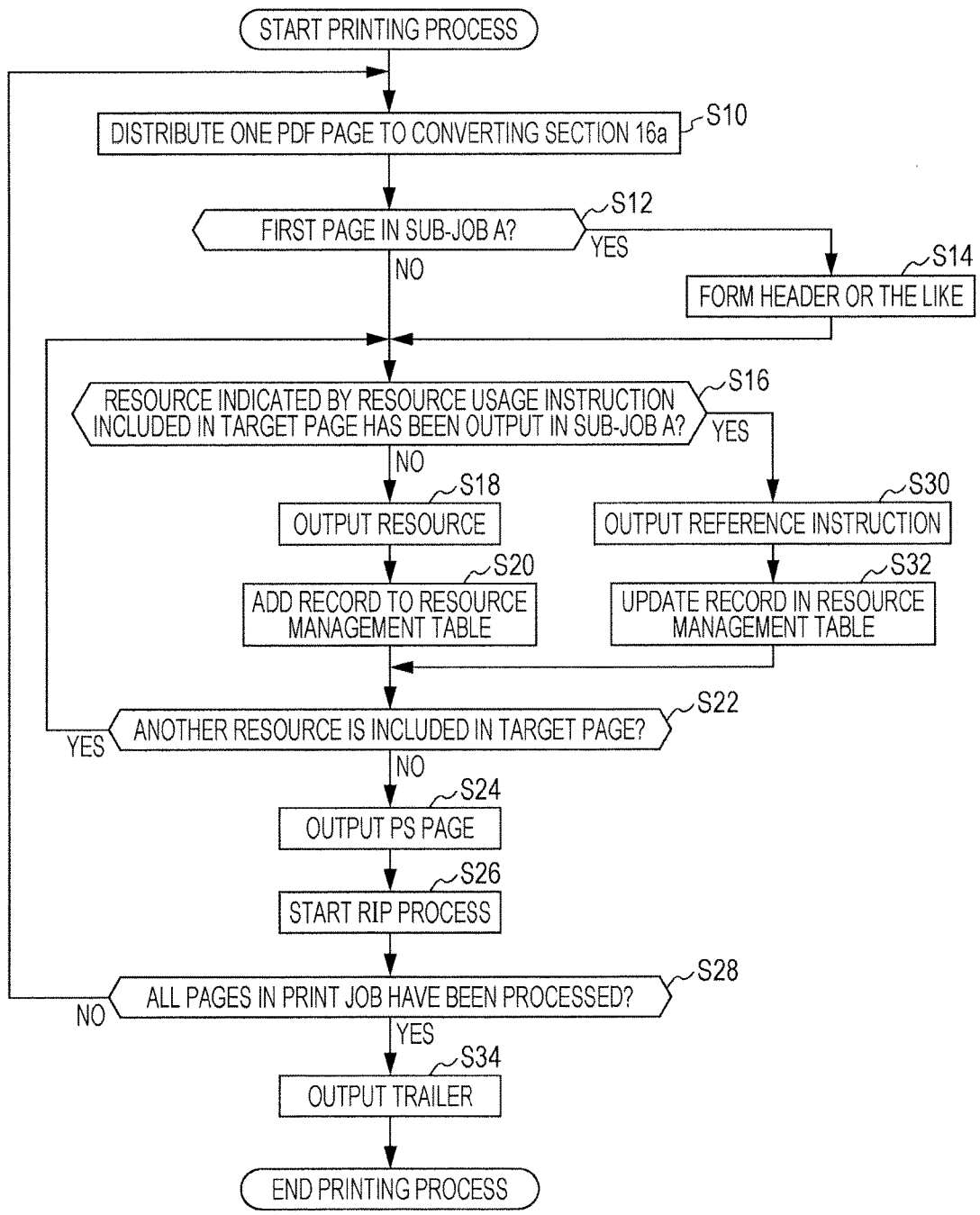
FIG. 2 is a flowchart illustrating a flow of a process performed by the image forming apparatus according to the exemplary embodiment.

FIG. 2 is a flowchart illustrating a flow of a printing process performed by the image forming apparatus 10. As described above, the image forming apparatus 10 includes three processing paths, and the same process is performed in the individual processing paths. Thus, the flowchart in FIG. 2 describes a process performed in the processing path including the converting section 16a and the RIP 20a. A sub-job distributed to this processing path is referred to as a "sub-job A" for convenience.

In this example, it is assumed that each page of a print job includes an instruction to use resources, as illustrated in FIG. 3. For example, the page 1 includes an instruction to use three resources: "Font1", "Form1", and "Image1".

In step S10, the page management module 14 distributes one page (hereinafter referred to as a "PDF page") in the print job in the PDF format which is the first PDL format (hereinafter referred to as a "PDF job") to the converting section 16a. The condition in which the PDF page is distributed to the converting section 16a is that, as described above, a page request signal is transmitted from the RIP 20a to the page management module 14. The destination to which the first page of the PDF job (or the first and subsequent pages the number of which corresponds to the number of processing paths) is distributed may be predetermined. If the destination is determined to be the converting section 16a, the PDF page is distributed to the converting section 16a.

In step S12, the page management module 14 determines whether or not the PDF page distributed in step S10 is the first page in the sub-job A. Here, the first page in the PDF job is distributed in step S10. The page is of course the first page in the sub-job A, and thus the process proceeds to step S14.

In step S14, the page management module 14 transmits, to the converting section 16a, a signal indicating that the target to be processed this time is the first page of the sub-job A. The converting section 16a that has received the signal forms a header of the print job in the PS format which is the second PDL format (hereinafter referred to as a "PS job") or a definition of procedure that is used in all PS jobs in common.

In step S16, the converting section 16a determines, with reference to the resource management table stored in the table memory 18a, whether or not a resource indicated by the resource usage instruction included in the target PDF page to be processed has been output in a page that has previously been processed in the sub-job A. Here, the target PDF page is the first page of the sub-job A and no data is stored in the resource management table, and thus the process proceeds to step S18.

In step S18, the converting section 16a performs a process of converting the target PDF page into a page in the PS format (hereinafter referred to as a "PS page"). In this conversion process, the converting section 16a includes, in the converted PS page, the resources (definition of the resources) indicated by the resource usage instruction included in the target PDF page. That is, the resources are output in the PS page.

Referring to FIG. 3, since the page 1 of the PDF page includes a resource "Font1", the resource "Font1" is output to the PS page. The resource is output to the PS page such that the RIP 20a is able to cache and reuse it. For example, a description "font entity (dictionary format) FontName exch definefont pop" is included in the PS page. In a case where it is impossible to make an expression for using a cache due to the language specifications of PS, an expression may be made by using a unique internal command.

In step S20, the converting section 16a newly adds information (record) indicating the resource output in step S18 to the resource management table stored in the table memory 18a. FIG. 4A illustrates an example of the resource management table. As illustrated in FIG. 4A, the resource management table stores various pieces of information about the resource output by the converting section 16a.

The pieces of information managed in the resource management table are as follows. "Destination RIP ID" is an ID identifying the RIP in which the PS page including the resource is processed. In the exemplary embodiment, a converting section and a resource management table are provided for each RIP, and thus the destination RIP ID in all the records in the resource management table stored in the table memory 18a is the ID identifying the RIP 20a. For example, in a case where one converting section performs conversion processes in plural processing paths, the converting section is able to determine which resource has been output to which processing path by referring to the destination RIP ID.

"Resource ID" is an ID identifying the type of the output resource, and "resource type" indicates the type (for example, "Font1"). "Identification code" is an ID uniquely identifying the resource and is a character string that is obtained by hashing the resource. "Document ID" is an ID uniquely identifying a document related to the print job including the instruction to use the resource (for example, a PDF file). "Resource data size" indicates the data capacity of the resource. "Number of times of use" indicates the number of instructions to use the resource in the print job. "Used page" indicates the page number of the page including the instruction to use the resource in the print job.

These pieces of information are included in the PDF page. The converting section 16a obtains these pieces of information from the PDF page when performing a conversion process.

In step S22, the converting section 16a determines whether or not another resource (a resource other than the resource processed in step S16 and thereafter) is included in the target PDF page. Here, since an instruction to use a resource other than "Font1" is included in the target PDF page (the first page of the PDF job), the process returns to step S16.

In step S16 and thereafter, a process is performed for the resource "Form1" included in the target PDF page. First, in step S16, it is determined whether or not the resource "Form1" has been output in the sub-job A. Since the resource "Form1" has not been output, the resource "Form1" is output to the converted PS page in step S18. In step S20, the record about the resource "Form1" is added to the resource management table.

Further, since the target PDF page includes the resource "Image1", the process returns to step S16. In step S16, it is determined whether or not the resource "Image1" has been output in the sub-job A. Since the resource "Image1" has not been output, the resource "Image1" is output to the converted PS page in step S18. In step S20, the record about the resource "Image1" is added to the resource management table.

As a result of the above-described process, records R1, R2, and R3 are added to the resource management table stored in the table memory 18a, as illustrated in FIG. 4B. After the process for all the resources for which a usage instruction is included in the target PDF page has finished, the process proceeds from step S22 to step S24.

In step S24, the converting section 16a outputs the PS page obtained through the conversion process to the RIP 20a. The PS page output in step S24 corresponds to the first page of the print job, and the PS page includes the resources "Font1", "Form1", and "Image1".

In step S26, the RIP 20a that has received the PS page performs a RIP process on the PS page. In the RIP process, the three resources "Font1", "Form1", and "Image1" included in the PS page are expanded. The expanded resources are stored in the temporary file memory 22a. After that, raster data that is obtained through the RIP process is transmitted to the output section 24 and is output.

In step S28, the page management module 14 determines whether or not all the pages included in the print job (PDF job) have undergone the conversion process and RIP process. Here, an unprocessed page remains in the print job, and thus the process returns to step S10.

In step S10, the page management module 14 distributes a PDF page to the converting section 16a in accordance with a page request instruction from the RIP 20a. Here, it is assumed that the page 4 in the PDF job is distributed to the converting section 16a. As illustrated in FIG. 3, the page 4 of the PDF job includes an instruction to use the resources "Font1" and "Image1".

This is a process for the second page in the sub-job A, and thus the process proceeds from step S12 to step S16.

In step S16, the converting section 16a determines whether or not the resource "Font1" included in the target PDF page has been output in the sub-job A. Specifically, the converting section 16a searches the resource management table (see FIG. 4B) stored in the table memory 18a for a record about the resource "Font1" by using the resource ID or resource type as a key. Here, the record R1 is detected as such a record. With the record being detected, the converting section 16a determines that the resource "Font1" has been output in the sub-job A, and the process proceeds to step S30.

In step S30, the converting section 16a performs a process of converting the target PDF page into a page in the PS format (hereinafter referred to as a "PS page"). In the conversion process, the converting section 16a does not include the resource (definition of the resource) indicated by the resource usage instruction included in the target PDF page in the converted PS page, but includes a reference instruction to refer to the output resource in the converted PS page. Here, a reference instruction to refer to the resource included in the first PS page in the previous step S18 is included. For example, a description "FontName findfont 12 scalefont setfont" is included in the PS page.

In step S32, the converting section 16a performs a process of updating the record in the resource management table. Specifically, the converting section 16a performs a process of, for the record about the resource indicated by the reference instruction output in step S30 (here, the record R1), incrementing the number of times of use by one and adding the page 4 to the used page.

The target PDF page includes an instruction to use "Image1" in addition to "Font1" processed in steps S30 and S32, and thus the process returns from step S22 to step S16. In step S16, referring to FIG. 4B, the record about the resource "Image1" (the record R3) is included in the resource management table, that is, the resource "Image1" has been output in the sub-job A, and thus the process proceeds to step S30. In step S30, a reference instruction to refer to the output resource "Image1" is included in the converted PS page. In step S32, the record R3 is updated.

The process from step S10 to step S32 is performed for each page included in the PDF job. After the process for all the pages included in the PDF job has finished, the process proceeds from step S28 to step S34, where the converting section 16a outputs a trailer indicating the end of the sub-job A to the RIP 20a, and the printing process ends.

Figure 5:
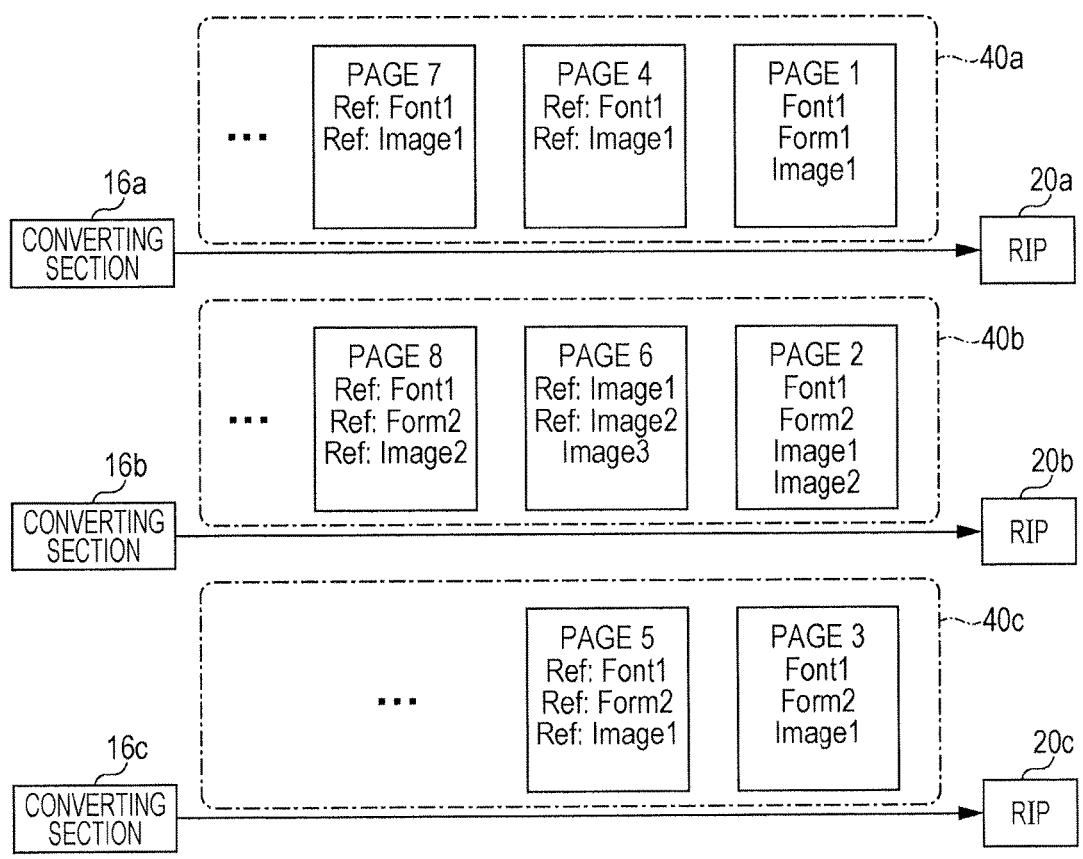
FIG. 5 is a conceptual diagram illustrating an example of PS data according to the exemplary embodiment.

FIG. 5 is a conceptual diagram illustrating plural PS pages that have been converted by the converting sections 16a to 16c in the three processing paths in the image forming apparatus 10. PDF pages 1, 4, 7, are distributed to the first processing path including the RIP 20a and are converted into PS pages 1, 4, 7, by the converting section 16a. The plural PS pages 1, 4, 7, processed in the first processing path form a PS sub-job 40a. Likewise, in the second processing path including the RIP 20b, a PS sub-job 40b including plural PS pages 2, 6, 8, is formed. In the third processing path including the RIP 20c, a PS sub-job 40c including plural PS pages 3, 5, is formed.

As described above and as illustrated in FIG. 5, a resource is not output in a duplicate manner in each of the PS sub-jobs 40a to 40c. For example, in the PS sub-job 40a, the resources "Font1", "Form1", and "Image1" are included in the preceding PS page 1. In the subsequent PS pages 4 and 7, "Font1" and "Image1" are used but these resources are not included in these pages, and a reference instruction to refer to "Font1" and "Image1" included in the PS page 1 is included therein.

In a case where a reference instruction is included in a PS page, the capacity of the PS page may be smaller than in a case where a resource is output to the PS page. Thus, the capacity of the subsequent PS page may be reduced by including a reference instruction, instead of a resource, in the subsequent PS page. Accordingly, the load on the image forming apparatus 10 for transferring data may be reduced. Further, it is not necessary for a RIP to repeatedly perform a process of expanding the same resource, the time taken to perform a RIP process may be reduced in an entire print job and accordingly a printing process may be performed at a higher speed.

In the same sub-job, in a case where the target PDF page includes an instruction to use a resource that is not included in the preceding PDF page, a converting section outputs the resource to the PS page that is obtained by converting the target PDF page. For example, referring to the sub-job 40b illustrated in FIG. 5, the PDF page 6, which is a subsequent page, includes an instruction to use the resource "Image3", which is not included in the preceding PDF page 2. In this case, the resource "Image3" is output to the converted PS page 6. Of course, in a case where the resource "Image3" is used in the PDF page subsequent to the PDF page 6 in the second processing path, a reference instruction to refer to the resource "Image3" output to the PS page 6 is included in the PS page that is obtained by converting the PDF page.

Figure 6:
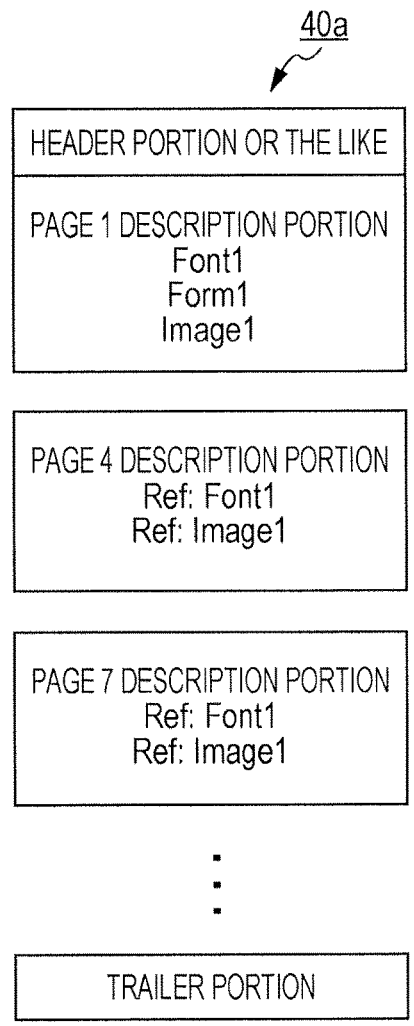
FIG. 6 is a conceptual diagram illustrating an example of a PS data structure in one sub-job.

FIG. 6 illustrates the data structure of the PS sub-job 40a. The PS sub-job 40a includes a header portion or the like that is formed first and that is included in a PS page 1, which is the first page and is transmitted to the RIP 20a. Upon receiving the PS page 1, the RIP 20a is able to start a RIP process on the PS page 1. After that, PS pages are output one by one. Every time the RIP 20a receives a PS page, the RIP 20a performs a RIP process on the PS page. That is, the RIP 20a is able to individually perform a process on each page. In this way, the converting section is able to output PS pages one by one and the RIPs 20a to 20c are able to perform a RIP process on each page, and thus each page of a print job (PDF job) may be flexibly distributed to a corresponding one of the processing paths.

Modification Example

As described above, in the image forming apparatus 10, the converting sections 16a to 16c output resources and then the records about the resources are stored in the corresponding resource management tables. However, if the number of resources output from the converting sections 16a to 16c increases and the number of records in the resource management tables increases, the cost for managing the resource management tables increases. Further, in conversion processes performed by the converting sections 16a to 16c, in the case of determining whether or not a resource indicated by a usage instruction included in a target PDF page is a resource that has been output, it is necessary to search for a large number of records, which may increase the time for a printing process.

Accordingly, an upper limit of the number of records may be preset in the resource management tables, and if the number of records in the resource management tables is equal to or larger than the upper limit, the converting sections 16a to 16c may stop referring to the resource management tables (stop the determination process in step S16), and all the resources indicated by a usage instruction included in the target PDF page may be included in a converted PS page.

From the viewpoint of reducing the number of records in a resource management table in advance, a resource whose capacity is smaller than a certain capacity may be omitted from the resource management table. In this case, when a PDF page including an instruction to use such a resource is converted, the PS page always includes the resource. However, since the capacity of the resource is small, the resource does not have much influence on the load on the image forming apparatus 10 and the time taken for a RIP process.

Two Operation Modes

As describes above, the image forming apparatus 10 is able to operate in two operation modes: a single job mode and a resource sharing mode. The controller 26 is able to select either of the two operation modes in accordance with an instruction provided from a user. That is, the controller 26 functions as an operation mode selecting section that selects an operation mode. Hereinafter, the two operation modes will be described with reference to FIGS. 1 and 7.

Figure 7:
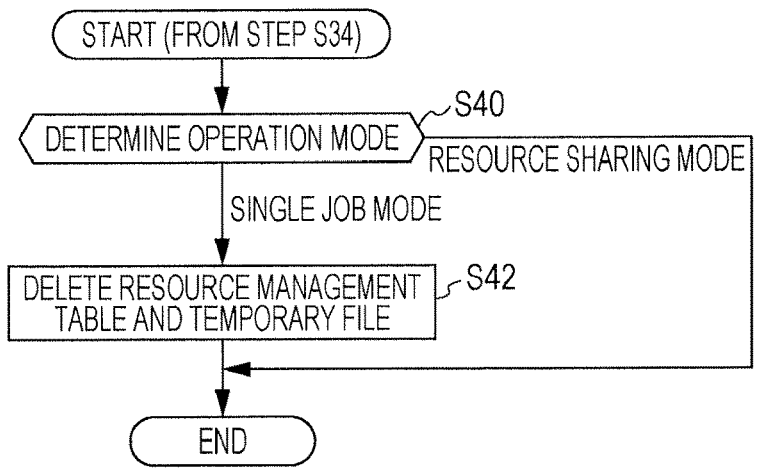
FIG. 7 is a flowchart illustrating a flow of a process in individual operation modes.

The process described in the flowchart illustrated in FIG. 7 is performed after step S34 in the flowchart illustrated in FIG. 2. In step S40, the controller 26 determines the operation mode of the image forming apparatus 10. The operation mode is set by a user in advance.

If the operation mode is the single job mode, the process proceeds to step S42, where the controller 26 performs a process of deleting the resource management tables stored in the table memories 18a to 18c and the temporary files stored in the temporary file memories 22a to 22c. That is, the single job mode is a mode in which, every time a printing process on one print job is finished, the resource management tables and temporary files (including expanded resources) generated in the printing process are deleted.

If the operation mode is the resource sharing mode, the process ends with step S42 being skipped. That is, the resource sharing mode is a mode in which, even after a printing process on a print job is finished, the resource management tables and temporary files generated in the printing process are kept stored.

In the resource sharing mode, the resource management tables and temporary files generated in the preceding printing process are usable in a printing process on the subsequent print job. In particular, in a case where a print job for the same document is repeatedly input, it is not necessary in the printing process on the subsequent print job to add a record to a resource management table or update records in the resource management table, and also a process of expanding a resource by a RIP may be omitted. This may contribute to increase the speed of the printing process. Whether or not the document related to the subsequent print job is the same as the document related to the preceding print job is determined by comparing a document ID that identifies the document and included in the subsequent print job with a document ID that is stored in the resource management table.

Process of Deleting Resource Management Tables and Temporary Files

As described above, in the image forming apparatus 10, a process of adding a record to a resource management table or updating records in the resource management table is performed during a printing process, and temporary files including expanded resources are stored in the temporary file memories 22a to 22c.

However, if some error occurs during the printing process, unintended data (hereinafter referred to as "error data") may be stored in the resource management tables or the temporary file memories 22a to 22c.

If an error occurs during the printing process, the image forming apparatus 10 restarts the printing process in accordance with an instruction provided from a user, or performs the printing process again from the beginning.

In a case where the printing process is restarted (or performed again from the beginning) after an error occurs, if error data remains in the resource management tables or the temporary file memories 22a to 22c, unpredictable failure may occur in the printing process. Thus, if an error occurs during the printing process, it is desirable to reliably delete the error data in an error recovery process.

In the image forming apparatus 10, if an error occurs during a printing process, the controller 26 performs a process of deleting the data stored in the resource management tables and the data stored in the temporary file memories 22a to 22c in an error recovery process performed for the error. Accordingly, when the printing process is restarted after the error, the occurrence of unpredictable failure may be prevented.

The data to be deleted may be selected in accordance with the part where an error has occurred in a printing process. For example, if an error occurs in a process performed by the converting section 16a, only the data stored in the resource management table stored in the table memory 18a may be deleted. If an error occurs in a process performed by the RIP 20a, only the data stored in the temporary file memory 22a may be deleted.

The controller 26 may perform a process of deleting the data stored in the resource management tables and the data stored in the temporary file memories 22a to 22c also at the time of restarting the image forming apparatus 10 for maintenance of the apparatus, in addition to the time of error recovery. Further, the data may be deleted if the configuration of the image forming apparatus 10 has been changed. For example, if the RIP 20c has been removed, the data stored in the resource management table stored in the table memory 18c is deleted, and also the data stored in the temporary file memory 22c is deleted.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a controller configured to act as:
      a processing unit group forming section that forms a plurality of processing unit groups by grouping a plurality of processing units included in a print job;
      a converting section that converts, for each of the plurality of processing units, the print job from PDF data into PS data so as to form a plurality of PS data groups corresponding to the plurality of processing unit groups;
   a plurality of raster image processors that correspond to the plurality of PS data groups, each of the plurality of raster image processors performing a conversion process of converting a corresponding one of the plurality of PS data groups into raster data; and
   a memory that stores output resource information in which information indicating a common resource included in the preceding PS data is distinguished and accumulated for each of the plurality of processing unit groups,
   wherein, in a case where a total number of resources included in the output resource information reaches a certain value and in a case where a set of processing units included in the plurality of processing unit groups include an instruction to use the resource, the converting section includes the resource also in subsequent PS data that is obtained by converting a subsequent processing unit in the set of processing units.

2. The image forming apparatus according to claim 1, wherein the output resource information includes print job identification information that is provided for each print job and that uniquely identifies a document related to the print job, and the image forming apparatus has a first operation mode in which the memory keeps storing the output resource information even after a printing process on the print job is completed.

3. The image forming apparatus according to claim 2, further comprising:

an operation mode selecting section that selects either of the first operation mode and a second operation mode in which the output resource information is deleted when a printing process on the print job is completed.

4. The image forming apparatus according to claim 3, wherein the output resource information is deleted in an error recovery process that is performed after an error occurs in a printing process on the print job.

5. The image forming apparatus according to claim 2, wherein the output resource information is deleted in an error recovery process that is performed after an error occurs in a printing process on the print job.

6. The image forming apparatus according to claim 1, wherein the output resource information is deleted in an error recovery process that is performed after an error occurs in a printing process on the print job.

7. A non-transitory computer readable medium storing a program causing a computer to execute a process, the process comprising:

forming a plurality of processing unit groups by grouping a plurality of processing units included in a print job;

converting, for each of the plurality of processing units, the print job from PDF data into PS data so as to form a plurality of PS data groups corresponding to the plurality of processing unit groups; and performing a conversion process of converting each of the plurality of PS data groups into raster data, wherein, in a case where a total number of resources included in the output resource information reaches a certain value and in a case where a set of processing units included in the plurality of processing unit groups include an instruction to use the resource, the converting includes the resource also in subsequent PS data that is obtained by converting a subsequent processing unit in the set of processing units.

* * * * *